(12) United States Patent
Plevel

(10) Patent No.: US 9,577,865 B2
(45) Date of Patent: Feb. 21, 2017

(54) CARRIER RECOVERY AIDED BY PILOT SYMBOLS CARRYING INFORMATION

(71) Applicant: Aviat U.S., Inc., Santa Clara, CA (US)

(72) Inventor: Sreco Plevel, Domzale (SI)

(73) Assignee: Aviat U.S., Inc., Milpitas, CA (US)

( * ) Notice: Subject to any disclaimer, the term of this patent is extended or adjusted under 35 U.S.C. 154(b) by 0 days.

(21) Appl. No.: 15/144,731

(22) Filed: May 2, 2016

(65) Prior Publication Data

US 2016/0248618 A1    Aug. 25, 2016

Related U.S. Application Data

(63) Continuation of application No. 13/798,065, filed on Mar. 12, 2013, now Pat. No. 9,337,964.

(60) Provisional application No. 61/609,879, filed on Mar. 12, 2012.

(51) Int. Cl.
| | |
|---|---|
| *H04L 27/38* | (2006.01) |
| *H04L 1/20* | (2006.01) |
| *H04L 27/00* | (2006.01) |
| *H04L 27/34* | (2006.01) |
| *H04L 7/04* | (2006.01) |
| *H04L 27/36* | (2006.01) |

(52) U.S. Cl.
CPC ........... *H04L 27/3836* (2013.01); *H04L 1/206* (2013.01); *H04L 7/048* (2013.01); *H04L 27/0014* (2013.01); *H04L 27/34* (2013.01); *H04L 27/366* (2013.01); *H04L 2027/0087* (2013.01)

(58) Field of Classification Search
CPC combination set(s) only.
See application file for complete search history.

(56) References Cited

U.S. PATENT DOCUMENTS

| | | | |
|---|---|---|---|
| 5,946,292 | A | 8/1999 | Tsujishita et al. |
| 7,359,453 | B1 | 4/2008 | Hietala et al. |
| 7,397,869 | B2 | 7/2008 | Ginesi et al. |
| 7,450,654 | B2 | 11/2008 | Singh et al. |
| 2008/0056305 | A1* | 3/2008 | Medvedev ............ H04L 1/0045 370/491 |
| 2009/0310707 | A1 | 12/2009 | Cheng et al. |
| 2011/0058595 | A1 | 3/2011 | Skeet |

(Continued)

OTHER PUBLICATIONS

International Application No. PCT/US2013/030627, International Search Report and Written Opinion mailed May 20, 2013.

*Primary Examiner* — Kabir A Timory
(74) *Attorney, Agent, or Firm* — Sheppard, Mullin, Richter & Hampton LLP

(57) ABSTRACT

A receiver may comprise: a symbol receiver configured to receive a first modulated symbol at a first resolution and thereafter a second modulated symbol at a second resolution greater than the first resolution; an output path coupled to the symbol receiver and configured to forward the first modulated symbol; a decision device coupled to the symbol receiver and configured to determine a most probable symbol represented by the first modulated symbol; a phase detector coupled to the decision device and configured to compare the first modulated symbol and the most probable symbol to generate a phase error value; and a phase modifier coupled to the decision device and configured to determine a phase correction value based on the phase error value and to adjust the phase of the second modulated symbol based on the phase correction value.

12 Claims, 11 Drawing Sheets

(56) References Cited

U.S. PATENT DOCUMENTS

2012/0099668 A1* 4/2012 Sakata ................ H04B 7/0613
375/267

* cited by examiner

CARRIER RECOVERY AIDED BY PILOT SYMBOLS CARRYING INFORMATION

CROSS-REFERENCE TO RELATED APPLICATIONS

The present application is a continuation of U.S. patent application Ser. No. 13/798,065, filed Mar. 12, 2013 and entitled "Carrier Recovery Aided by Pilot Symbols Carrying Information," now U.S. Pat. No. 9,337,964, which claims priority to U.S. Provisional Patent Application Ser. No. 61/609,879, filed Mar. 12, 2012 and entitled "Carrier Recovery Aided by Pilots Carrying Information," which are hereby incorporated by reference herein.

TECHNICAL FIELD

The technical field relates to communication systems and methods. More particularly, the technical field relates to carrier recovery in communications systems and methods.

BACKGROUND

Most communications systems use a transmitter and a receiver to transfer information across a transmission medium. The transmitter may interface with devices that send information over the transmission medium and may include a modulator to convert information from the devices into a format compatible with the transmission medium. Conversely, the receiver of a communication system may interface with devices that receive information, and may include a demodulator to convert information from the transmission medium into a format that the devices can use. Many modern communications systems consolidate the functionalities of a transmitter and a receiver into a transceiver that sends and receives information. In many communications systems, the transceiver may be capable of modulating and demodulating information between devices and the transmission medium.

In an ideal communications system, all of the modulated information placed in a transmission medium by a transmitter could be demodulated by a corresponding receiver without errors. That is, in an ideal world, a receiver could extract all the information placed on the transmission medium without any loss of information. In the real world, however, factors such as the components incorporated into the receiver, the environmental conditions surrounding the receiver, and the characteristics of the transmission medium may cause the receiver to lose some of the information placed on the transmission medium. It would be desirable to prevent loss of the information modulated into the transmission medium.

SUMMARY

A receiver may comprise: a symbol receiver configured to receive a first modulated symbol at a first resolution and thereafter a second modulated symbol at a second resolution greater than the first resolution; an output path coupled to the symbol receiver and configured to forward the first modulated symbol; a decision device coupled to the symbol receiver and configured to determine a most probable symbol represented by the first modulated symbol; a phase detector coupled to the decision device and configured to compare the first modulated symbol and the most probable symbol to generate a phase error value; and a phase modifier coupled to the decision device and configured to determine a phase correction value based on the phase error value and to adjust the phase of the second modulated symbol based on the phase correction value.

In some embodiments, the first modulated symbol and the second modulated symbol are Quadrature Amplitude Modulation (QAM) symbols. The first resolution may comprise a pilot data resolution and the second resolution may comprise a standard data resolution. The first resolution may comprise a standard data resolution and the second resolution may comprise a pilot data resolution. The phase modifier may include a loop filter coupled to the phase detector, the loop filter being configured to assist in determining the phase correction value.

In some embodiments, the receiver may further comprise an error correction system coupled to the phase modifier and configured to perform forward error correction on the first modulated symbol and the second modulated symbol. The error correction system may perform error correction after the phase modifier adjusts the phase. In some embodiments, one more of the decision device, the phase detector, and the phase modifier are incorporated into a modem.

In some embodiments, the receiver may comprise a tuner for tuning the effect of the phase error value on the determination of phase correction value. The tuner may tunes the effect of the phase error based on the resolution. The symbol receiver may further receives a pilot dataless symbol, the phase detector compares the pilot dataless symbol against a known reference symbol to generate a second phase error value, and the phase modifier determines a second phase correction value based on the second phase error value and adjusts the phase of a subsequent modulated symbol based on the second phase correction value.

Disclosed is a method comprising: receiving a first modulated symbol at a first resolution; forwarding the first modulated symbol to an output path; determining a most probable symbol represented by the first modulated symbol; comparing the first modulated symbol and the most probable symbol to generate a phase error value; determining a phase correction value based on the phase error value; receiving a second modulated symbol at a second resolution greater than the first resolution; and adjusting the phase of the second modulated symbol based on the phase correction value.

In some embodiments, the first modulated symbol and the second modulated symbol are Quadrature Amplitude Modulation (QAM) symbols. The first resolution may comprise a pilot data resolution and the second resolution may comprise a standard data resolution. The first resolution may comprise a standard data resolution and the second resolution may comprise a pilot data resolution. The step of determining a phase correction value may further comprise using a loop filter.

The method may comprise performing forward error correction on the first modulated symbol and the second modulated symbol. In some embodiments, further comprising performing error correction after the phase modifier adjusts the phase. In some embodiments, at least one of the steps may be performed by a modem.

The method may comprise tuning an effect of the phase error value on the determination of phase correction value. In various embodiments, the tuning the effect is based on the resolution. The method may further comprise: receiving a pilot dataless symbol; comparing the pilot dataless symbol against a known reference symbol to generate a second phase error value; determining a second phase correction value based on the second phase error value; and adjusting the phase of a subsequent modulated symbol based on the second phase correction value.

Disclosed is a transmitter comprising: a data interface for receiving data; a modulator coupled to the data interface and configured to modulate a first portion of the data using a first resolution and a second portion of the data using a second resolution; and a transmitter for transmitting the modulated first and second portions of the data to a receiver.

Disclosed is a method comprising: receiving data; modulating a first portion of the data using a first resolution; modulating a second portion of the data using a second resolution; and the modulated first and second portions of the data to a receiver.

DETAILED DESCRIPTION

Figure 1:
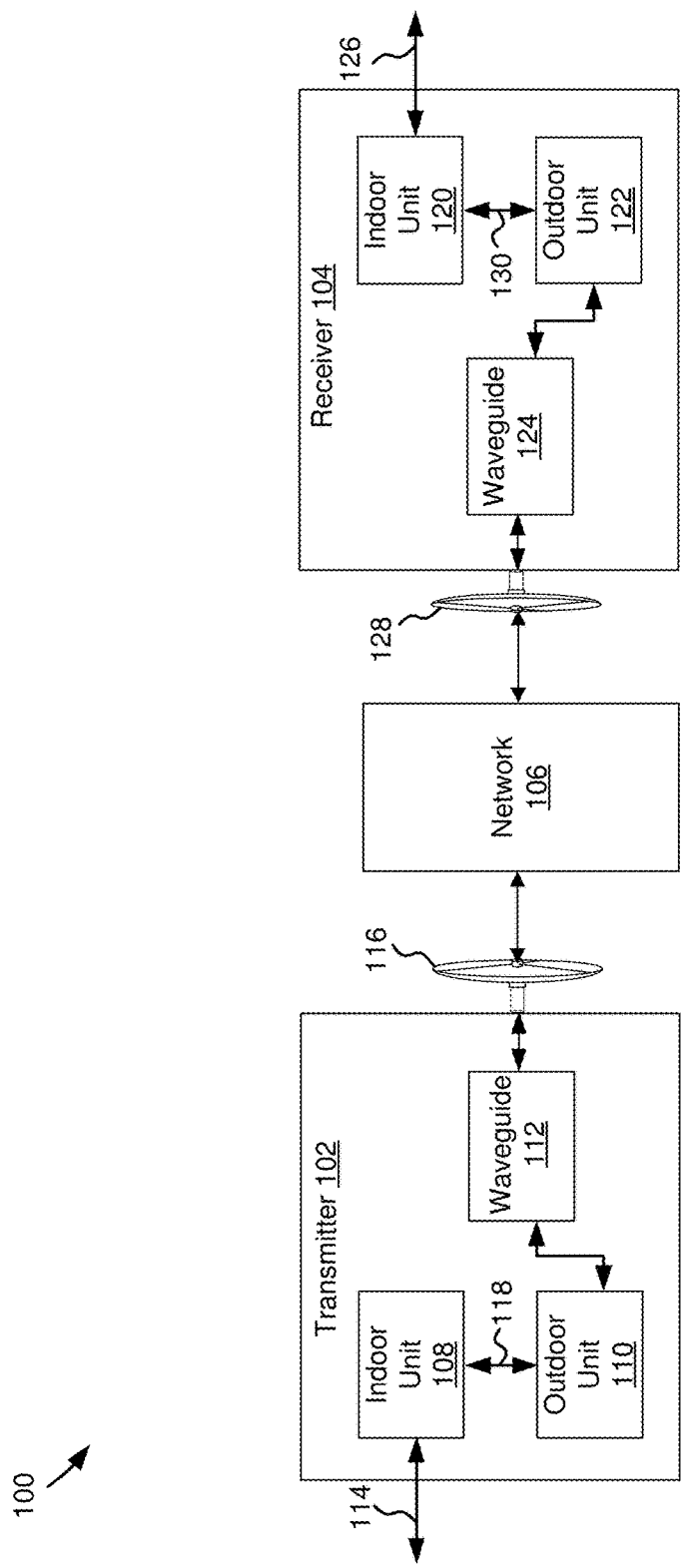
FIG. 1 shows an example of a communications system environment, according to some embodiments.

FIG. 1 shows an example of a communications system environment 100, according to some embodiments. The communications system environment 100 may include a transmitter 102 and a receiver 104. One or more of the transmitter 102 and the receiver 104 may be split mount radios. A split-mount radio has a part of the electronics mounted outdoors with an antenna and part indoors. The outdoor unit (ODU) may be the RF transmitter/receiver. The indoor unit (IDU) contains the modulator/demodulator, multiplexer, control, and traffic interface elements. The IDU and ODU may be coupled together using a cable. By comparison, an all-indoor radio has all radio equipment installed inside and is connected to its antenna using a waveguide or coax feeder. A split-mount radio may be a point-to-point radio installation for licensed 6 to 38+GHz frequency bands with the ODU direct-mounted to the rear of the antenna to provide an integral antenna feed. By having the ODU mounted with the antenna, split-mount may eliminate or reduce feeder losses, minimize or reduce rack occupancy, and/or lower installed costs compared to indoor radios.

For example, the transmitter 102 may comprise an indoor unit (IDU) 108 in communication with a processor and/or a digital device, an outdoor unit (ODU) 110 in communication with the IDU 108 over cables (shown as coaxial cable 118), a waveguide 112 in communication with the ODU 110, and an antenna 116. The IDU 108 may comprise a modulator/demodulator and control circuitry for providing data from a digital device or a processor over line 114 to the antenna 116 via the ODU 110 and/or the waveguide 112. The ODU 110 may comprise an RF transmitter/receiver and be coupled with the antenna 116. The waveguide 112 may or may not be a part of the ODU 110.

The IDU 108 of the transmitter 102 may be coupled to the ODU 110 utilizing a coaxial cable 118. Although a single coaxial cable 118 is depicted in FIG. 1, any number of coaxial cables may provide signals between the IDU 108 and the ODU 110. Further, those skilled in the art will appreciate that any number and/or type of cables may be configured to receive and transmit signals between the IDU 108 and the ODU 110.

Similarly, the receiver 104 may comprise an IDU 120 in communication with a processor and/or a digital device, an ODU 122 in communication with the IDU 120 over cable (shown as a coaxial cable 130), a waveguide 124 in communication with the ODU 122, and an antenna 128. The IDU 120 may comprise a modulator/demodulator and control circuitry for receiving information from the antenna 128 via the ODU 122 for providing to the digital device or processor via the line 126. The ODU 122 may comprise an RF transmitter/receiver and be coupled with the antenna 128. The waveguide 124 may or may not be a part of the ODU 122.

The IDU 120 of the receiver 104 may be coupled to the ODU 122 utilizing a coaxial cable 130. Although only one coaxial cable 130 is depicted in FIG. 1, any number of coaxial cables may provide signals between the IDU 108 and the ODU 110. Further, those skilled in the art will appreciate that any number and/or type of cables may be configured to receive and transmit signals between the IDU 108 and the ODU 110.

Though FIG. 1 shows the transmitter 102 and the receiver 104 as incorporating split-mount radios, it is noted that one or more of the transmitter 102 and the receiver 104 may comprise a full ODU, such as a full ODU having Power over Ethernet. In these embodiments, the functionalities performed by the IDU 108 and the IDU 120 in FIG. 1 may be performed by the full ODU.

The transmitter 102 and the receiver 104 may be in communication with each other over a network 106. It is noted that the transmitter 102 and the receiver 104, individually or together, may communicate with any digital device or receiver. The network 106 may include a wired network, a wireless network, or some combination thereof to facilitate the reception and transmission of information.

In various embodiments, the transmitter 102 and the receiver 104 may implement portions of a carrier recovery system. Sources of error, such as physical characteristics of components in the transmitter 102 and the receiver 104, the properties of the network 106, and the environmental conditions of the communications system environment 100, for instance, may cause modulated data to appear inaccurately at the receiver 104. Typically, the transmitter 102 and the receiver 104 may implement an error correction system to detect and remove errors in a received signal once the received signal has been demodulated. However, in many instances, the sources of error may corrupt properties of the signal while the signal is in a modulated state. For example, in many instances, the sources of error may cause the signal to the receiver 104 to contain a phase error. If such a phase error were present in the modulated signal to the receiver 104, the phase error could prevent error correction systems from operating properly. For instance, since phase errors typically need to be tracked quickly after they occur, and since error correction systems such as FEC decoders are highly dependent on the correct phase, there can be a high probability of incorrect Quadrature Amplitude Modulation (QAM) symbols detected even in cases where there is a low bit error rate after FEC decoding.

To ensure error correction systems receive an accurate estimation of the phase of a transmitted signal, a multilevel QAM encoder in the transmitter 102 may inject, possibly at a predetermined interval, pilot data symbols at a pilot data resolution that is lower than the standard data resolution of standard data symbols. Pilot data symbols are symbols that carry information that may be represented at a QAM resolution lower than the resolution of standard data symbols. For example, if standard data symbols have a standard data resolution of 1024 QAM, the multilevel QAM encoder may inject pilot data symbols having a pilot data resolution of 256 QAM. The injected pilot data symbols may be modulated into a modulated carrier wave sent by the transmitter 102. Both the pilot data symbols and the standard data symbols may be used for estimating phase error of a transmitted signal.

Although the phrase "at a lower resolution" is used herein to refer to a property of the pilot data symbols, it is noted that the multilevel QAM encoder may use multiple sets of pilot data symbols, with each set being characterized by a different resolution. For example, in some embodiments, the multilevel QAM encoder may incorporate a first set of pilot data symbols having a 64 QAM resolution, a second set of pilot data symbols having a 128 QAM resolution, a third set of pilot data symbols having a 256 QAM resolution, and so on. In various embodiments, the multilevel QAM encoder may also step-up the pilot data symbols. For instance, the multilevel QAM encoder may initially provide a first set of pilot data symbols at a smallest resolution (e.g., a 128 QAM resolution), provide symbols at the standard resolution of data traffic (e.g., a 1024 QAM resolution), and then provide a second set of pilot data symbols at an intermediate resolution (e.g., a 256 QAM resolution), and so on.

Figure 2:
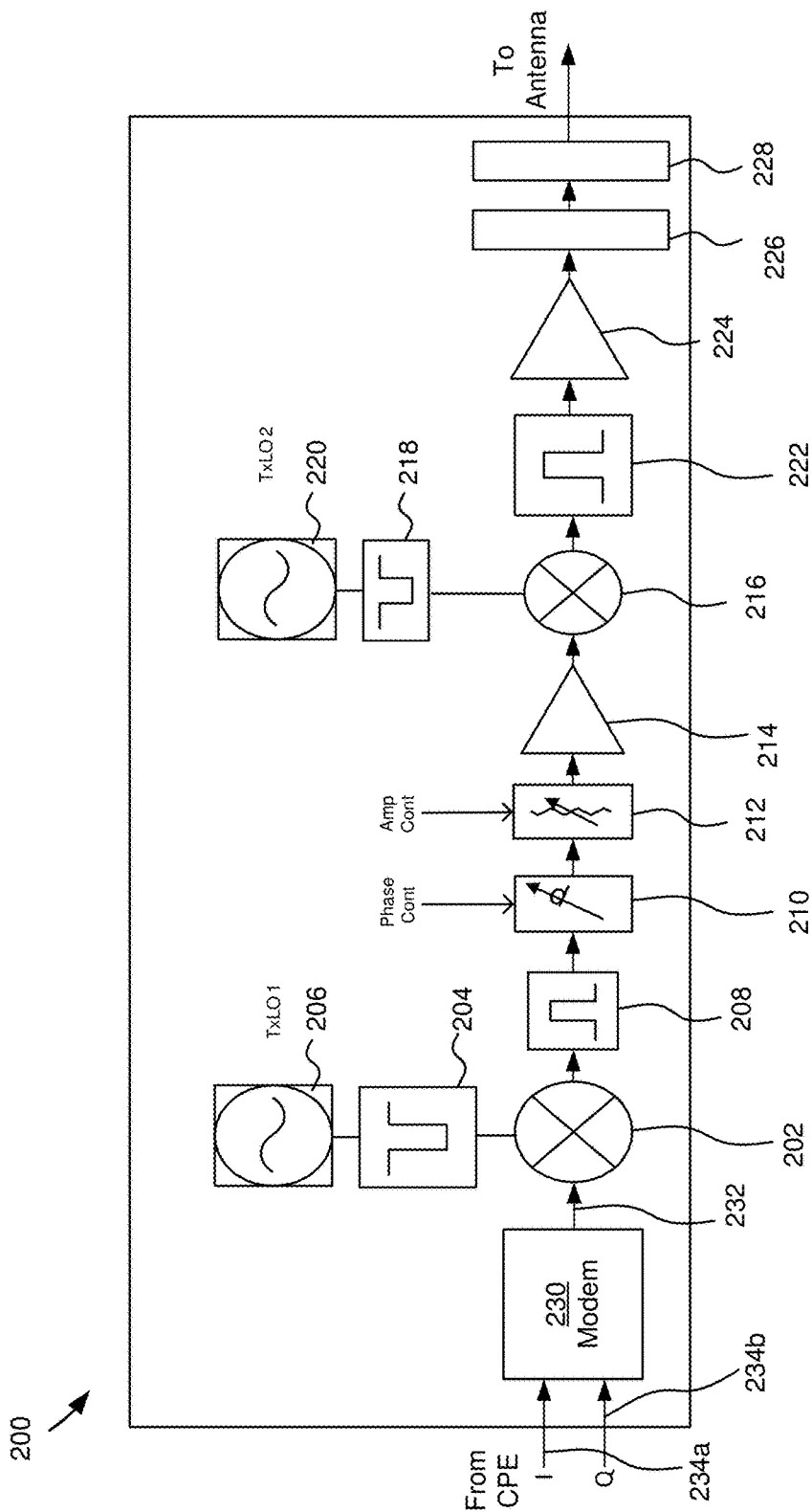
FIG. 2 shows an example of a transmitter unit, according to some embodiments.
Figure 3:
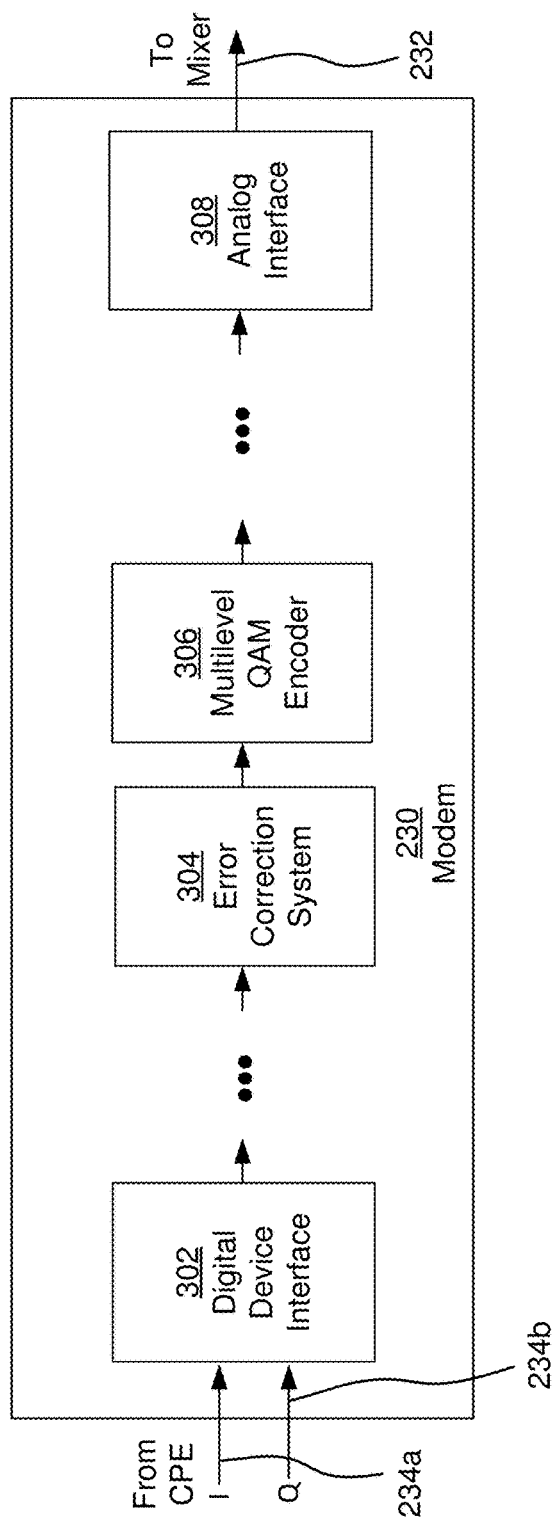
FIG. 3 shows an example of a modem inside a transmitter, according to some embodiments.
Figure 4:
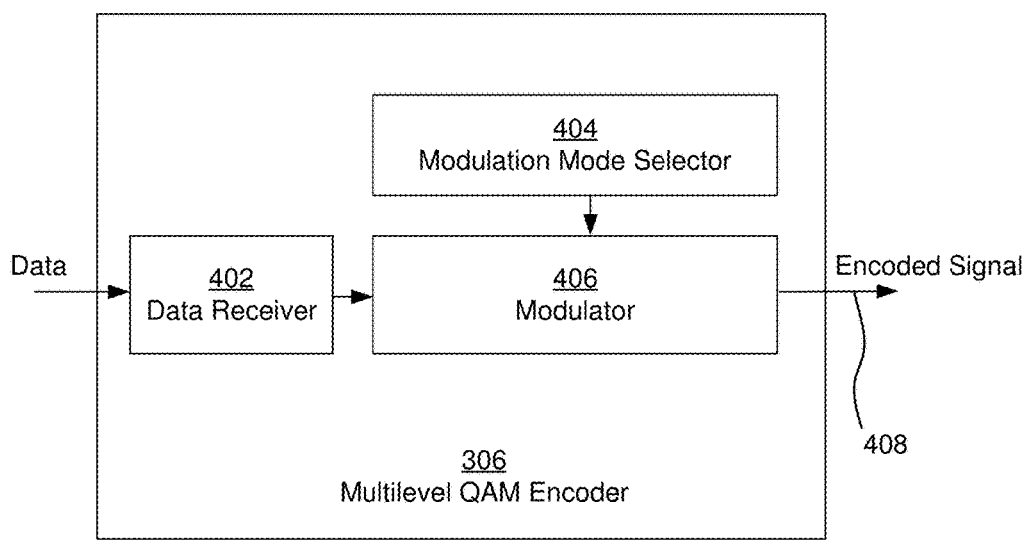
FIG. 4 shows an example of a multilevel QAM encoder, according to some embodiments.

It is noted that the multilevel QAM encoder may also inject, possibly at intervals, a dataless pilot signal that does not contain any data. FIGS. 2-4 show examples of a multilevel QAM encoder in further detail.

A carrier recovery system inside the receiver 104 may be configured to evaluate whether symbols received on the carrier wave are accurate. In some embodiments, the carrier recovery system may supply corrections by determining the most probable QAM constellation point represented by a received symbol, and performing a phase modification based on the determination. The carrier recovery system may determine the most probable QAM constellation point for pilot data symbols and/or standard data symbols. In various embodiments, the carrier recovery system may also perform carrier recovery using dataless pilot signals and/or pilot data symbols at more than one pilot data resolution. FIGS. 5-8 show examples of a carrier recovery system in further detail.

FIG. 2 shows an example of a transmitter unit 200, according to some embodiments. The transmitter unit 200 may comprise a modem 230, mixer modules 202 and 216, filter modules 204, 208, 218, and 222, oscillator modules 206 and 220, a phase adjuster 210, an automatic gain control (AGC) module 212, amplification/attenuation modules 214 and 224, waveguide filter 226, and waveguide 228. It is noted that the components shown in the transmitter unit 200 are examples relevant to the inventive concepts described herein, and that the transmitter unit 200 may contain other components. The transmitter unit 200 may be a part of the transmitter 102. For instance, the transmitter unit 200 may be part of some combination of the ODU 110 and the IDU 108.

In various embodiments, the transmitter unit 200 may be configured to facilitate the transmission of data 234 from a digital device through the antenna 116. The data 234 may comprise information represented in complex numbers, may have an in-phase component 234a and a quadrature component 234b. The in-phase component 234a and the quadrature component 234b may correspond to digital in-phase and quadrature inputs, respectively.

The modem 230 may be configured to perform modulation and demodulation. To this end, the modem 230 may be configured to transform the data 234 to a modulated signal 232. The modulated signal 232 may have a format that is compatible for transmission over the antenna 116. In some embodiments, the modem 230 may employ a QAM scheme to create the modulated signal 232. The modem 230 may use a keying scheme, such as amplitude-shift keying (ASK), phase-shift keying (PSK), or some other combination of amplitude modulation or phase modulation to incorporate information from the data 234 into the modulated signal 232. It is noted that other modulation and/or keying schemes are possible without departing from the inventive concepts described herein.

In various embodiments, the modulated signal 232 contains standard data symbols (which are data symbols modulated at a standard data resolution), and one or more sets of pilot data symbols (which are data symbols modulated at a pilot data resolution). As a result, in some embodiments, the modulated signal 232 may have a resolution of one or more of 128 QAM, 256 QAM, 512 QAM, 1024 QAM, 2048 QAM, etc. signals. A specific symbol and/or the resolution of the modulated signal 232 may be represented by a constellation, an example of which is given in FIG. 9. Though QAM modulation of digital signals is described herein, it is noted that the data 234 may take any form without departing from the inventive concepts described herein.

As stated above, different portions of the modulated signal 232 may be modulated at different resolutions. For instance, one portion of the modulated signal 232 may have a first resolution, and another portion of the modulated signal 232 may have a second resolution. In various embodiments, portions of the modulated signal 232 may comprise pilot data symbols having a pilot data resolution, while other portions of the modulated signal 232 may have standard data symbols having a standard data resolution that is greater than the pilot data resolution. As will be discussed below, the modem 230 may be configured to intersperse symbols at one resolution with symbols of another resolution. Such interspersal of symbols at different resolutions may facilitate efficient carrier recovery in a receiver that receives the modulated signal 232. Detecting phase errors in pilot data symbols having a resolution lower than the standard data resolution may dramatically reduce the probabilities of errors and/or error correction system inaccuracies.

As noted above, in some embodiments, the modulated signal 232 may also include pilot dataless symbols. The pilot dataless symbols may have a resolution (like other data symbols in the modulated signal 232) but need not carry any information. The pilot dataless symbols may assist the modem 230 to adjust the frequency and/or phase in a receiver. The use of the modem 230 to perform carrier recovery in a receiver using modulated symbols of varying resolutions is further discussed in conjunction with FIGS. 3 and 4.

The mixer module 202, filter module 204, and the oscillator module 206 may represent an upconverter configured to upconvert a signal received from the modem 230 to an intermediate frequency signal. Similarly, the mixer module 216, filter module 218, and oscillator module 220 also may represent an upconverter configured to further upconvert the signal to an RF signal. Those skilled in the art will appreciate that there may be any number of upconverters configured to upconvert the signals within the transmitter unit 200.

The mixer modules 202 and 216 may comprise mixers configured to mix the signal(s) provided by the modem with one or more other signals. The mixer modules 202 and 216 may comprise many different types of mixers with many different electrical properties. In one example, the mixer module 202 mixes the signal received from the modem 230 with the filtered oscillating signal from the filter module 204 and the oscillator module 206. In another example, the mixer module 216 mixes a signal received from the amplification/attenuation module 214 with the filtered oscillating signal from the filter module 218 and the oscillator module 220.

Those skilled in the art will appreciate that each of the mixer modules 202 and 216 may be the same as one or more other mixer modules. For example, mixer modules 202 and 216 may both be mixers sharing the same electrical properties or, alternately, the mixer modules 202 and 216 may be another kind of mixer and/or with different electrical properties. Each mixer modules 202 and 216 may include one or more components. For example, the mixer module 202 may comprise one or more mixers.

The filter modules 204, 208, 218, and 222 may comprise filters configured to filter the signal. The filter modules 204, 208, 218, and 222 may comprise many different types of filters (e.g., bandpass filter, low pass filter, high pass filter, or the like) with many different electrical properties. In one example, the filter module 204 may be a band pass filter configured to filter the oscillation signal (or components of the signal) provided from the oscillator module 206. Similarly, filter modules 204, 208, 218, and 222 may filter signals (or components of the signals) from the oscillator module 206, the oscillator module 220, the mixer module 202, or the mixer module 216, respectively.

Those skilled in the art will appreciate that each of the filter modules 204, 208, 218, and 222 may be the same as one or more other filter modules. For example, the filter modules 204 and 208 may both be filters sharing the same electrical properties while filter module 218 may be another kind of filter. In another example, the filter modules 204 and 208 may both be filters of a similar type but have different electrical properties.

Each of the filter modules 204, 208, 218, and 222 may include one or more components. For example, the filter modules 204 may comprise one or more filters.

The oscillator modules 206 and 220 may comprise oscillators configured to provide an oscillating signal that may be used to upconvert the signal. The oscillator modules 206 and 220 may comprise any kind of oscillator with any different electrical properties. In one example, the oscillator module 206 provides an oscillating signal to the filter module 204. The oscillator module 220 may provide an oscillating signal to the filter module 218.

The oscillator modules 206 and 220, either individually or together, may be local or remote. In one example, the oscillator module 206 and/or the oscillator module 220 may be remotely located and configured to provide an oscillating signal to one or more transmitting radio frequency units. In some embodiments, a single oscillating module may provide an oscillating signal to both the mixer module 202 and 216, respectively (e.g., optionally via a filter). In one example, the oscillator signal from the oscillator module may be altered (e.g., oscillation increased or decreased) and provided to a different part of the circuit.

Those skilled in the art will appreciate that each of the oscillator modules 206 and 220 may be the same as each other. For example, oscillator modules 206 and 220 may both be oscillators sharing the same electrical properties or, alternately, the oscillator modules 206 and 220 may be another kind of oscillator and/or with different electrical properties. Each oscillator modules 206 and 220 may include one or more components. For example, the oscillator module 206 may comprise one or more oscillators.

In various embodiments, the transmitter unit 200 includes a signal quality module. The signal quality module may be configured to generate a phase control signal to control the phase of a processed signal. In one example, the signal quality module receives the upconverted RF signal from the amplification/attenuation module 224 and mixes the amplified or attenuated signal with the filtered oscillator signal or the upconverted signal from the second upconverter. The signal quality module may filter the signal and compare the filtered, mixed signal with a predetermined phase value to generate a phase control signal based on the comparison.

The phase adjuster 210 may comprise a variable phase control circuit configured to increase or decrease the phase of the signal to be transmitted. The phase adjuster 210 may comprise any different type of phase adjuster or phase shifter with different electrical properties. In one example, the phase adjuster 210 increases or decreases the phase of the signal received from the filter module 208. The phase adjuster 210 may adjust the phase of the signal based on the phase control signal from the signal quality module.

The AGC module 212 may comprise an automatic gain control (AGC) circuit configured to increase or decrease the gain of the signal received from the phase adjuster 210. The AGC module 212 may comprise many different types of AGCs with many different electrical properties. In one example, the AGC module 212 increases or decreases the gain of the signal received from the phase adjuster 210. The AGC module 212 may adjust the gain of the signal based on the gain control signal.

In various embodiments, in order to adjust the phase of the signal or the amplitude of the signal, the signal quality module may provide control signals to adjust the filtered signal from the filter module 208 to achieve the desired adjustment. For example, in order to adjust the phase or amplitude of the signal, the signal quality module may compare the phase and amplitude of the signal to be provided to the waveguide filter 226 and/or the waveguide 228 based on a predetermined phase value and/or a predetermined amplitude value. Based on the comparison, the signal quality module may generate phase and gain control signals to achieve the desired adjustment.

In some embodiments, the predetermined phase value and amplitude value may be the same or substantially similar as the phase and amplitude of the wireless signals outputted by one or more other transmitting radio frequency units. In one example, the phase and the amplitude of one or more transmitter may be synchronized.

The amplification/attenuation modules 214 and 224 may comprise an amplifier and/or an attenuator configured to amplify and/or attenuate a signal. The amplification/attenuation modules 214 and 224 may be any kind of amplifiers and/or attenuators. Further, the amplification/attenuation modules 214 and 224 may each comprise amplifiers and/or attenuators with any kind of electrical properties.

In some embodiments, the amplification/attenuation module 214 receives a signal from the AGC module 212. The amplification/attenuation module 214 may amplify or attenuate the signal. Further, the amplification/attenuation module 224 may attenuate the signal (or components of the signal) after the signal has been upconverted by the mixer module 216, the filter module 218, and the oscillator module 220. The amplification/attenuation module 224 may then provide the signal to the signal quality module and/or the waveguide filter 226.

Those skilled in the art will appreciate that each of the amplification/attenuation modules 214 and 224 may be the same as one or more other amplifier/attenuator modules. For example, amplification/attenuation modules 214 and 224 may both be amplifiers sharing the same electrical properties. In another example, amplification/attenuation modules 214 and 224 may both be amplifiers but have different electrical properties.

The transmitter unit 200 may comprise the waveguide filter 226 and the waveguide 228. The waveguide filter 226 may be any filter coupled to the waveguide 228 and configured to filter the electromagnetic waves (e.g., remove noise). The waveguide 228 may provide the signal to an antenna via a diplexer. The diplexer may provide the signal to the antenna. The waveguide 228 may be any waveguide kind or type of waveguide. For example, the waveguide 228 may be hollow or dielectric. In some embodiments, the waveguide 228 comprises a rectangular to circular waveguide.

FIG. 3 shows an example of a modem 230, according to some embodiments. As discussed, the modem 230 may be configured to modulate the data 234 from a digital device into a modulated signal 232 that has a format that can be transmitted over an antenna. In the example of FIG. 3, the modem 230 may include a digital device interface 302, an error correction system 304, a multilevel QAM encoder 306, and an analog interface 308. It is noted that the modem 230 may include other components that are known in the art.

The digital device interface 302 may include circuitry to interface with a digital device. In various embodiments, the digital device interface 302 may include one or more a Universal Serial Bus (USB) connection, a communication bus interface, a Personal Computer Memory Card International Association (PCMCIA) interface, or other interface. The digital device interface 302 may be configured to receive data 234 represented in complex numbers. The data 234 may have an in-phase component 234a and a quadrature component 234b.

The error correction system 304 may include circuitry to insert error correcting code (ECC) into the modulated signal 232. The ECC may include redundant data or parity data to the information contained in the demodulated signal. In some embodiments, the ECC may contain convolution codes and/or block codes. In some embodiments, the ECC can implement Turbo Coding and/or Low Density parity check coding, which can get close to theoretical Shannon limit of possible spectral efficiency. The error correction system 304 may implement other forward error correction (FEC) techniques and/or automatic repeat request (ARQ) or backward error correction techniques.

The multilevel QAM encoder 306 may include circuitry to create a modulated signal. In some embodiments, the output of the multilevel QAM encoder 306 may include portions for encoding the signal at different resolutions for different sets of symbols. For example, the multilevel QAM encoder 306 may insert pilot data symbols at a pilot data resolution and standard data symbols at a standard data resolution greater than the pilot data resolution. As noted above, the pilot data symbols and the standard data symbols carry information. In some embodiments, the multilevel QAM encoder 306 periodically inserts a pilot data symbol in the standard data symbol stream. For example, the multilevel QAM encoder 306 may insert a pilot data symbol every 5-10 standards data symbols. The multilevel QAM encoder 306 may also be configured to inject pilot dataless symbols into the modulated signal. The multilevel QAM encoder 306 is further discussed in conjunction with FIG. 4.

The analog interface 308 may include circuitry to provide the modulated signal 232 to analog components in the transmitter containing the modem 230. For example, as shown in FIG. 3, the analog interface 308 may include circuitry to interface with the mixer module 202. In various embodiments, the analog interface 308 may comprise a communications bus that couples the other components of the modem 230 to the mixer module.

FIG. 4 shows an example of a multilevel QAM encoder 306, according to some embodiments. The multilevel QAM encoder 306 may include a data receiver 402, a modulation mode selector 404, and a modulator 406. In various embodiments, the multilevel QAM encoder 306 may produce an encoded signal 408.

The data receiver 402 may include circuitry to receive a data signal from a portion of the modem 230 upstream of the multilevel QAM encoder 306. In various embodiments, the data receiver 402 may provide the data signal to the modulator 406.

The modulation mode selector (or data resolution selector) 404 may include circuitry to select one of a plurality of modulation modes. In some embodiments, the modulation mode selector 404 may incorporate a multiplexer to facilitate the selection of a particular operating mode. In some embodiments, one or more of the plurality of modulation modes may correspond to a specific modulation resolution, such as a pilot data resolution or a standard data resolution. In various embodiments, the modulation mode selector 404 may select more than one of the plurality of modulation modes. In some embodiments, by selecting a modulation mode corresponding to a particular resolution, the modulation mode selector 404 may instruct the modulator 406 how much information (e.g., how many bits of information) to place into a specific portion of the encoded signal 408.

The modulator 406 may include circuitry to encode the data into the encoded signal 408 at each of the plurality of modulation modes. For each of the plurality of modulation modes, the modulator 406 may create QAM symbols corresponding to data arriving from the data receiver 402 for each modulation mode. The modulator 406 may also insert pilot dataless symbols into the encoded signal 408.

Figure 5:
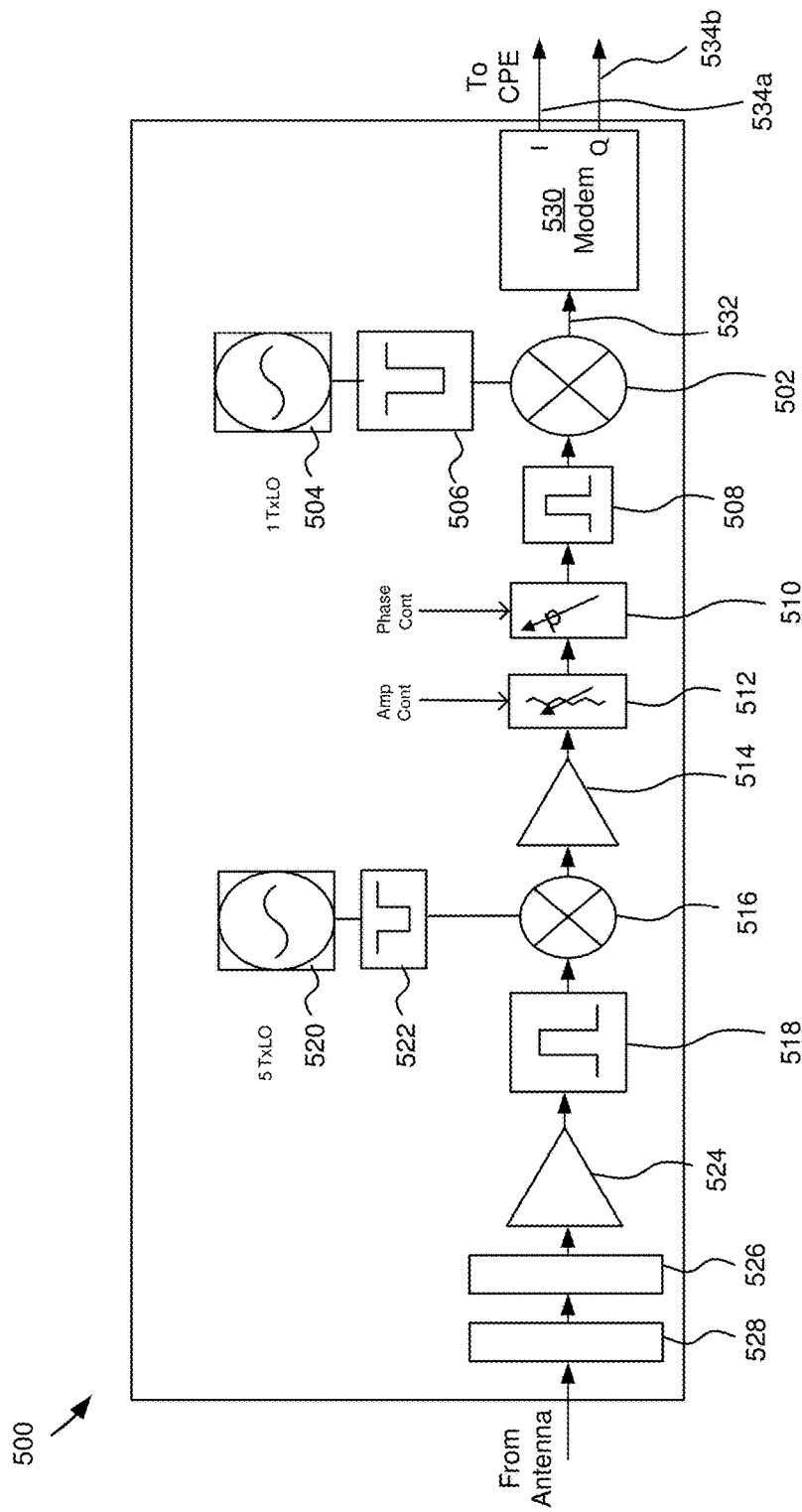
FIG. 5 shows an example of a receiver, according to some embodiments.

FIG. 5 shows an example of a receiver unit 500, according to some embodiments. The receiver unit 500 may comprise a modem 530, mixer modules 502 and 516, filter modules 504, 508, 518, and 522, oscillator modules 506 and 520, a phase adjuster 510, an automatic gain control (AGC) module 512, amplification/attenuation modules 514 and 524, waveguide filter 526, and waveguide 528. The receiver unit 500 may further comprise a signal quality module that may control the phase adjuster 510 and/or the AGC module 512. It is noted that the components shown in the receiver unit 500 are examples relevant to the inventive concepts described herein, and that the receiver unit 500 may contain other components.

The receiver unit 500 may be a part of the receiver 104, shown in FIG. 1. For instance, the receiver unit 500 may be part of some combination of the ODU 122 and the IDU 120.

In various embodiments, the receiver unit 500 may be configured receive data from a transmission medium for processing by a digital device. To this end, the receiver unit 500 may include one or more interfaces with a digital device. Examples of interfaces include wired network cables, wireless network connections, computer buses, and other connections.

The modem 530 may be configured to perform modulation and demodulation. That is, the modem 530 may transform a modulated signal 532 from the mixer module 502 into data 534, having in-phase component 534a and quadrature component 534b, for use by a digital device. In various embodiments, the modem 530 may use a QAM scheme and/or a keying scheme, such as ASK, PSK, or some other combination of amplitude modulation or phase modulation to incorporate information into the modulated signal 532. It is noted that other modulation and/or keying schemes are possible without departing from the inventive concepts described herein. The modulated signal 532 may contain modulated symbols to accommodate digital data. The modulated signal 532 may be modulated similarly to the modulated signal 232, discussed in the context of the modem 230. The modulated signal 532 may have multiple resolutions, such as one or more pilot data resolutions and a standard data resolution. The modulated signal 532 may also include pilot dataless symbols.

As will be discussed below, the modem 530 may be configured to efficiently detect and correct phase errors based on evaluating the phase of the pilot data symbols, the standard data symbols, and the pilot dataless symbols. The modem 530 may also include one or more modules to synchronize with a modem in a transmitter (e.g., the modem 230 in FIG. 2). In various embodiments, the modem 530 may include a carrier recovery loop to efficiently correct phase errors in the modulated signal 532. The use of the modem 530 to perform carrier recovery using modulated symbols of varying resolutions is further discussed in conjunction with FIGS. 6 and 7.

The mixer module 516, filter module 518, and oscillator module 550 may represent a downconverter configured to downconvert a received RF signal to an intermediate frequency signal. The mixer module 502, filter module 504, and the oscillator module 506 may represent another downconverter configured to further downconvert the intermediate signal to a baseband signal for processing by the modem 530.

The mixer modules 502 and 516 may comprise mixers configured to mix the signal(s) provided by the modem with one or more other signals. It is noted that each of the mixer modules 502 and 516 may be the same as one or more other mixer modules. For example, mixer modules 502 and 516 may both be mixers sharing the same electrical properties or, alternately, the mixer modules 502 and 516 may be another kind of mixer and/or with different electrical properties. Each mixer modules 502 and 516 may include one or more components. For example, the mixer module 502 may comprise one or more mixers. One or more of the mixer modules 502 and 516 may be configured similarly to the mixer modules 202 and 216, shown in FIG. 2.

The filter modules 504, 508, 518, and 522 may comprise filters configured to filter the signals inputted therein. For example, the filter modules 504 may comprise one or more filters. In various embodiments, the filter modules 504, 508, 518, and 522 may be configured similarly to the filter modules 204, 208, 218, and 222, shown in FIG. 2. The oscillator modules 506 and 520 may comprise oscillators configured to provide an oscillating signal that may be used to downconvert the received signal to the intermediate frequency signal and the baseband signal, respectively. The oscillator modules 506 and 520 may be configured similarly to the oscillator modules 206 and 220, shown in FIG. 2.

The AGC module 512 may comprise an automatic gain control (AGC) circuit configured to increase or decrease the gain of the signal received from the phase adjuster 510. The AGC module 512 may comprise many different types of AGCs with many different electrical properties. In one example, the AGC module 512 increases or decreases the gain of the signal received from the phase adjuster 510. The AGC module 512 may adjust the gain of the signal based on the gain control signal. The AGC module 512 may be configured similarly to the AGC module 212, shown in FIG. 2.

The amplification/attenuation modules 514 and 524 may each comprise an amplifier and/or an attenuator configured to amplify and/or attenuate a signal. The amplification/attenuation modules 514 and 524 may include components similar to the components of the amplification/attenuation modules 214 and 224 shown in FIG. 2. The waveguide filter 526 may be any filter coupled to the waveguide 528 and configured to filter the electromagnetic waves (e.g., remove noise). The waveguide 528 may receive the signal from the antenna via a diplexer. The diplexer may provide the signal to the antenna. The waveguide 528 may be similar to the waveguide 228 in FIG. 2.

Figure 6:
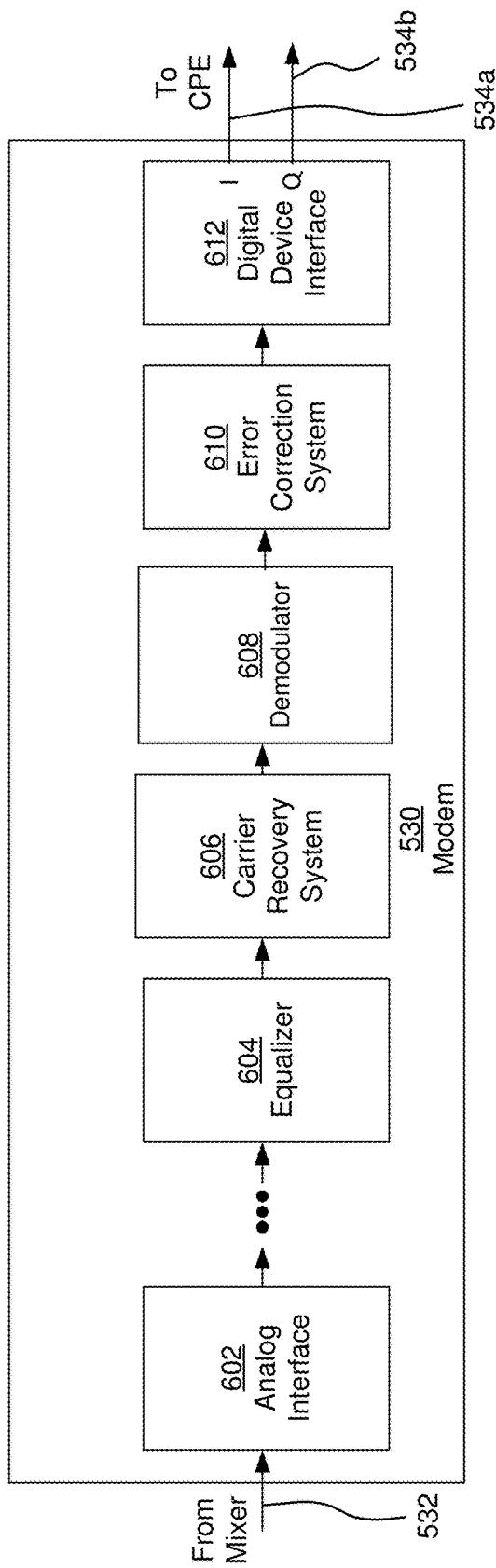
FIG. 6 shows an example of a modem inside a receiver, according to some embodiments.

FIG. 6 shows an example of a modem 530, according to some embodiments. The modem 530 may be configured to demodulate a modulated signal 532 from a mixer into data 534, having an in-phase component 534a and a quadrature component 534b, and having a format that is compatible with a digital device. The modem 530 may include an analog interface 602, an equalizer 604, a carrier recovery system 606, a demodulator 608, an error correction system 610, and a digital device interface 612. It is noted that the modem 530 include other components known in the art.

The analog interface 602 may include circuitry to receive the modulated signal 532 from analog components, such as the mixer module 502 in FIG. 5. The analog interface 602 may comprise a communications bus that couples the other components of the modem 530 to the mixer module 502.

The equalizer 604 may include circuitry to reduce distortion incurred by the modulated signal 532 as information in the modulated signal 532 passed through the transmissions medium. In various embodiments, the equalizer 604 may comprise a set of filters, estimators, and other circuitry to reduce intersymbol interference between symbols inside the modulated signal 532. In some embodiments, the modulated signal 532 may be a QAM signal, and the equalizer 604 may separate the modulated signal 532 into in-phase and quadrature components. The equalizer 604 may employ adaptive equalization and error detection techniques. The equalizer 604 may provide the equalized signal to the carrier recovery system 606.

The carrier recovery system 606 may include circuitry to perform carrier recovery of a modulated signal and to adjust the phase of the modulated signal as determined. The carrier recovery system 606 may receive modulated symbols in the modulated signal, provide a most probable estimate of a particular modulated symbol, and provide phase corrections to the modulated signal based on a comparison with the most probable estimate. As discussed, the carrier recovery system 606 may accommodate the fact that the modulated signal comprises pilot data symbols, standard data symbols, and/or pilot dataless symbols. In some embodiments, the carrier recovery system 606 may weight the corrections provided using the pilot data symbols to reduce the probability of phase error at a given signal to noise ratio. In various embodiments, the carrier recovery system 606 may also adjust the modulated signal using dataless pilot signals, and/or multiple sets of pilot data symbols at different resolutions. The carrier recovery system 606 is further discussed in conjunction with FIG. 7.

The demodulator 608 may demodulate the modulated signal inputted therein. In some embodiments, the demodulator 608 may include a QAM demodulator to extract a set of bits (i.e., the information modulated into the signal) from the demodulated signal.

The error correction system 610 may include circuitry to detect and remove errors in the demodulated signal from the demodulator 608. In some embodiments, the error correction system 610 may use redundant error detection techniques to determine whether information in the demodulated signal is what it says it is. For instance, the error correction system 610 may evaluate whether one or more redundant bits encoded within the demodulated signal appear as intended. In various embodiments, the error correction system 610 may incorporate FEC circuitry that evaluates the presence of ECC in the demodulated signal. The ECC may include redundant data or parity data to the information contained in the demodulated signal. In some embodiments, the ECC may contain convolution codes and/or block codes. In some embodiments, the ECC can implement Turbo Coding and/or Low Density parity check coding, which can get close to theoretical Shannon limit of possible spectral efficiency. Using the ECC and other techniques, the error correction system 610 may identify errors in the demodulated signal. In some embodiments, the error correction system 610 may be configured to recover the original data in the demodulated signal by correcting the errors within. The error correction system 610 may attempt to reconstruct the original contents of the demodulated signal based on the ECC. The error correction system 610 may also include automatic repeat request (ARQ) or backward error correction techniques as well.

The digital device interface 612 may include circuitry to interface with a digital device. In various embodiments, the digital device interface 612 may include one or more a Universal Serial Bus (USB) connection, a communication bus interface, a Personal Computer Memory Card International Association (PCMCIA) interface, or other interface.

Figure 7:
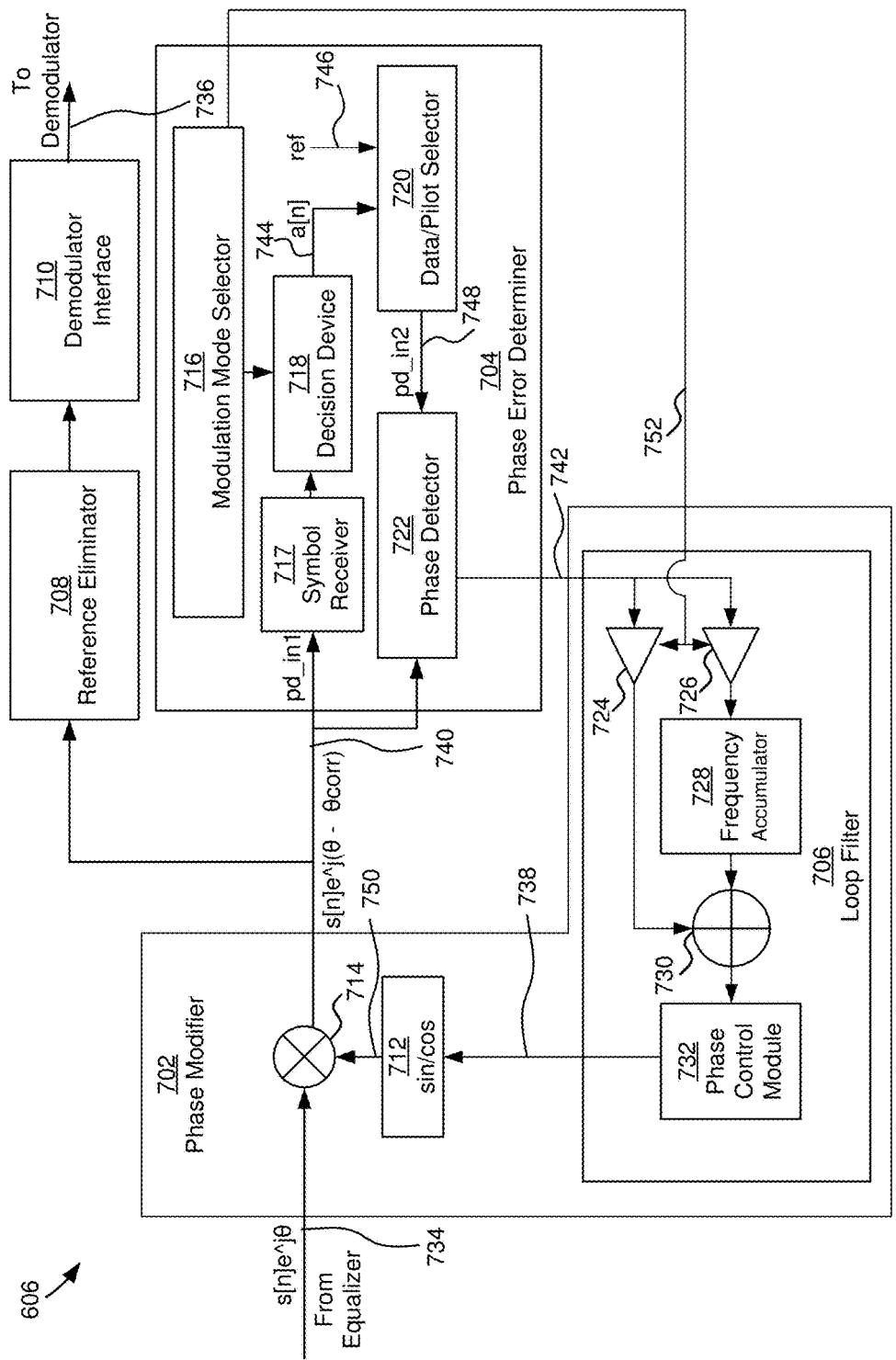
FIG. 7 shows an example of a carrier recovery system, according to some embodiments.

FIG. 7 shows an example of a carrier recovery system 606, according to some embodiments. The carrier recovery system 606 may include a phase modifier 702, a phase error determiner 704, a reference eliminator 708, and a demodulator interface 710. The carrier recovery system 606 may receive an equalized symbol 734 from the equalizer 604, and may provide a phase corrected signal 736 to the demodulator 608. It is noted that the carrier recovery system 606 may include other components known in the art. In some embodiments, the carrier recovery system 606 may be implemented as a phase locked loop (PLL), such as a digital PLL (DPLL). The carrier recovery system 606 may keep an oscillator of the receiver unit 500 locked to the carrier wave. In some embodiments, the carrier recovery system 606 may be implemented as instructions on a processor, such as digital signal processor (DSP). The carrier recovery system 606 may be particularly advantageous in a physical layer that allows multiple modulation levels to be interleaved in close neighborhood symbols.

The phase modifier 702 may be configured to adjust a phase of the equalized symbol 734 by a phase correction value 750 to provide the phase modified symbol 740. The phase modifier 702 may include circuitry to forward the phase modified symbol 740 to an output path comprising a path to the demodulator 608. The phase modifier 702 may include a numerically controlled oscillator 712, a multiplier 714 and a loop filter 706. The multiplier may multiply the phase correction value 750 with the equalized symbol 734 to produce the phase modified symbol 740. The numerically controlled oscillator 712 may be configured to provide the phase correction value 750 based on a filtered signal 738 from the loop filter 706. The loop filter 706 is discussed below.

The phase error determiner 704 may include circuitry to receive the phase modified symbol 740 and provide a phase error 742. The phase error determiner 704 may include a modulation mode selector 716, a symbol receiver 717, a decision device 718, a data/pilot selector 720, and a phase detector 722. The symbol receiver 717 may receive the phase modified symbol 740 from the phase modifier 702 and may provide the phase modified symbol 740 to the decision device 718.

The modulation mode selector 716 may include circuitry to select a modulation mode. In some embodiments, the modulation mode selector 716 may determine whether the phase modified symbol 740 is modulated as a pilot data symbol, a standard data symbol, or a pilot dataless symbol. The determination by the modulation mode selector 716 may be based on timing information about the modulation of the phase modified symbol 740. The modulation mode selector 716 may provide the selected modulation mode to the decision device 718.

The decision device 718 may include circuitry to determine the most probable symbol that represents the phase modified symbol 740. In some embodiments, the decision device 718 may access a set of lookup tables of all the potential constellation points possible at a particular resolution. Based on this predefined alphabet of constellation points, the decision device 718 may output the symbol which is the closest (and correspondingly, the most likely). The decision device 718 may then evaluate which potential constellation point in the lookup table is closest to the constellation point in the phase modified symbol 740. The decision device 718 then provides the most probable symbol 744 to the data/pilot selector 720. In case of a low signal to noise ratio or a high phase error, the decision device 718 has a probability of erroneously providing the most probable symbol. However, the probability of wrong detection by the decision device 718 may depend on the level of QAM modulation. As a result, by performing the most probable symbol determination on pilot data symbols, which have a lower resolution than standard data symbols, the decision device 718 may reduce the probability of erroneously providing the most probable symbol considerably.

The data/pilot selector 720 may include circuitry to provide a selected symbol 748 from the set of the most probable symbol 744 and a reference symbol to the phase detector 722, depending on whether the symbol being examined is a pilot dataless symbol OR either of a pilot data symbol or a standard data symbol is being examined. The data/pilot selector 720 may provide the selected symbol 748 to the phase detector 722.

The phase detector 722 may include circuitry to compare the phases of the selected symbol 748 and the phase modified symbol 740. In some embodiments, the phase detector 722 may multiply the selected symbol 748 with the complex conjugate of the phase modified symbol 740, and may take the imaginary part of the product. The phase detector 722 may provide the phase error 742 to the loop filter 706.

The loop filter 706 may include circuitry configured to condition the phase error 742 and provide the filtered signal to the numerically controlled oscillator 712. In various embodiments, the loop filter 706 may help limit the effect of impairments in the system and may ensure that the phase estimation provided in the phase error 742 is reliable. In some embodiments, the loop filter 706 may include a first gain component 724, a second gain component 726, a frequency accumulator 728, an adder 730, and a phase control module 732. The first gain component 724 and the second gain component 726 may receive a gain control signal 752 from the modulation mode selector 716. In some embodiments, the gain control signal 752 may allow the modulation mode selector 716 to appropriately weight the first gain component 724 and/or the second gain component 726, e.g., depending on whether a pilot data signal, a standard data signal, or a pilot dataless signal is being evaluated for phase error determination. The frequency accumulator 728 may be configured to adjust the frequency characteristics of the loop filter 706. The phase control module 732 may be configured to adjust the output phase of the loop filter 706. In various embodiments, the loop filter 706 may provide the filtered signal to the numerically controlled oscillator 712.

The reference eliminator 708 may eliminate pilot dataless symbols from being transmitted to the demodulator interface 710.

Figure 8:
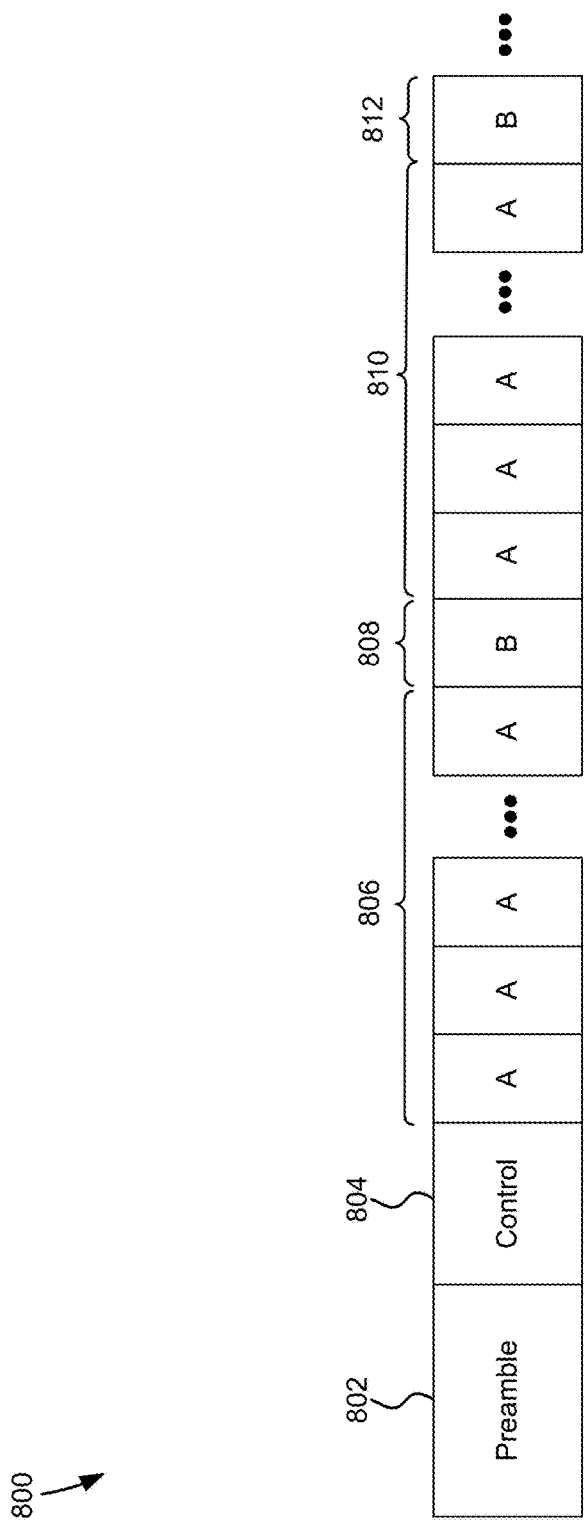
FIG. 8 shows an example of a data stream, according to some embodiments.

FIG. 8 shows an example of a modulated data stream 800, according to some embodiments. The modulated data stream 800 may comprise a preamble portion 802, a control portion 804, a first portion 806, a second portion 808, a third portion 810, and a fourth portion 812.

The preamble portion 802 may include a portion of the modulated data stream 800 used to synchronize the transmitter and the receiver. In various embodiments, the control portion 804 may also contain error checking information, including ECC, other FEC information, cyclic redundancy check (CRC) information, sequencing information, and other information. The first portion 806, the second portion 808, the third portion 810, and the fourth portion 812 may contain the payload of the modulated data stream 800. In this example, the first portion 806 may include a stream of standard data symbols at the standard data resolution (labeled "A"). The second portion 808 may contain a pilot data symbol at the pilot data resolution (labeled "B"). The third portion 810 may contain another stream of standard data symbols at the standard data resolution (labeled "A"). The fourth portion may include a pilot data symbol at the pilot data resolution (labeled "B").

Figure 9:
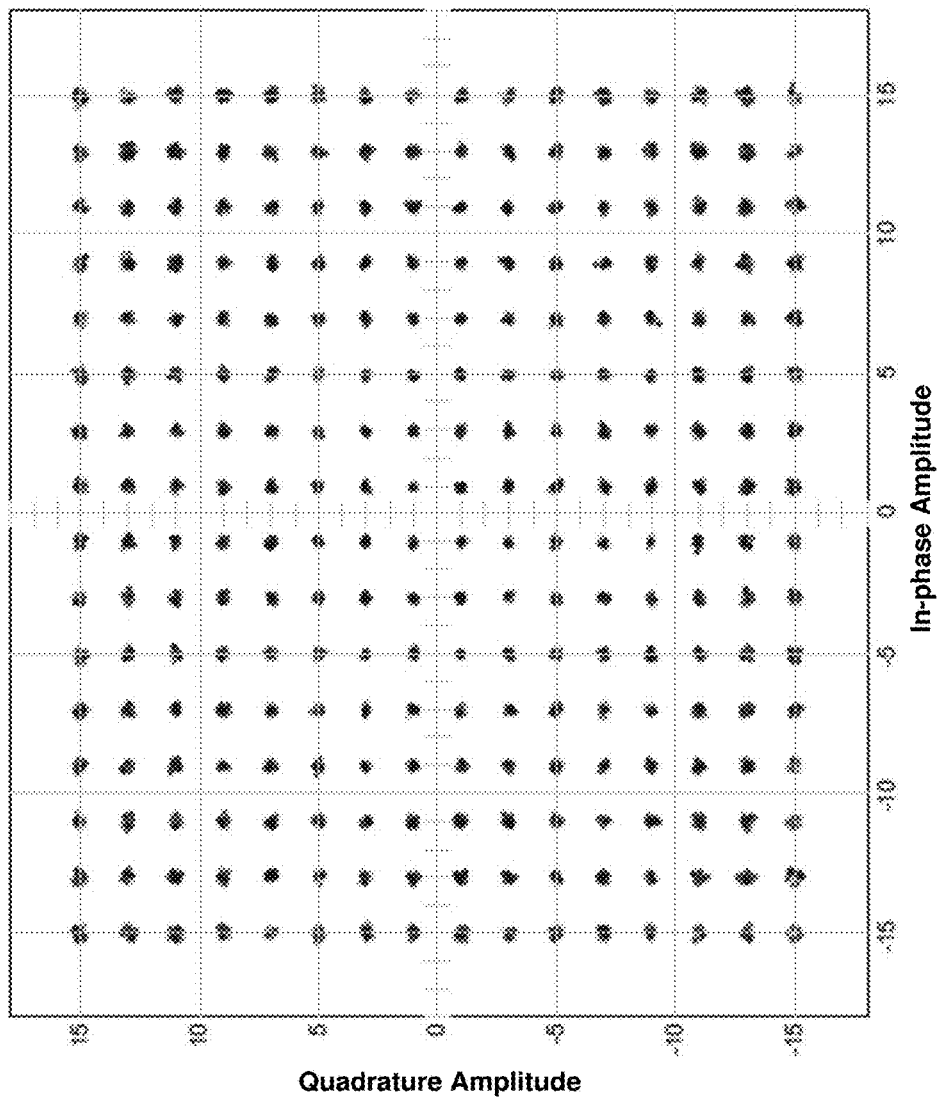
FIG. 9 shows an example of a Quadrature Amplitude Modulation (QAM) constellation at a first resolution, according to some embodiments.

FIG. 9 shows an example of a QAM constellation 900 at a pilot data resolution, according to some embodiments. The QAM constellation 900 may include a first axis to indicate an in-phase amplitude of a particular symbol and a second axis to indicate a quadrature amplitude of the particular symbol. As shown in FIG. 9, the QAM constellation 900 may contain sixteen in-phase amplitude points and sixteen quadrature amplitude points to provide 256 points where information can be held. The QAM constellation 900 may allow an eight bit signal to be represented in the carrier wave.

Figure 10:
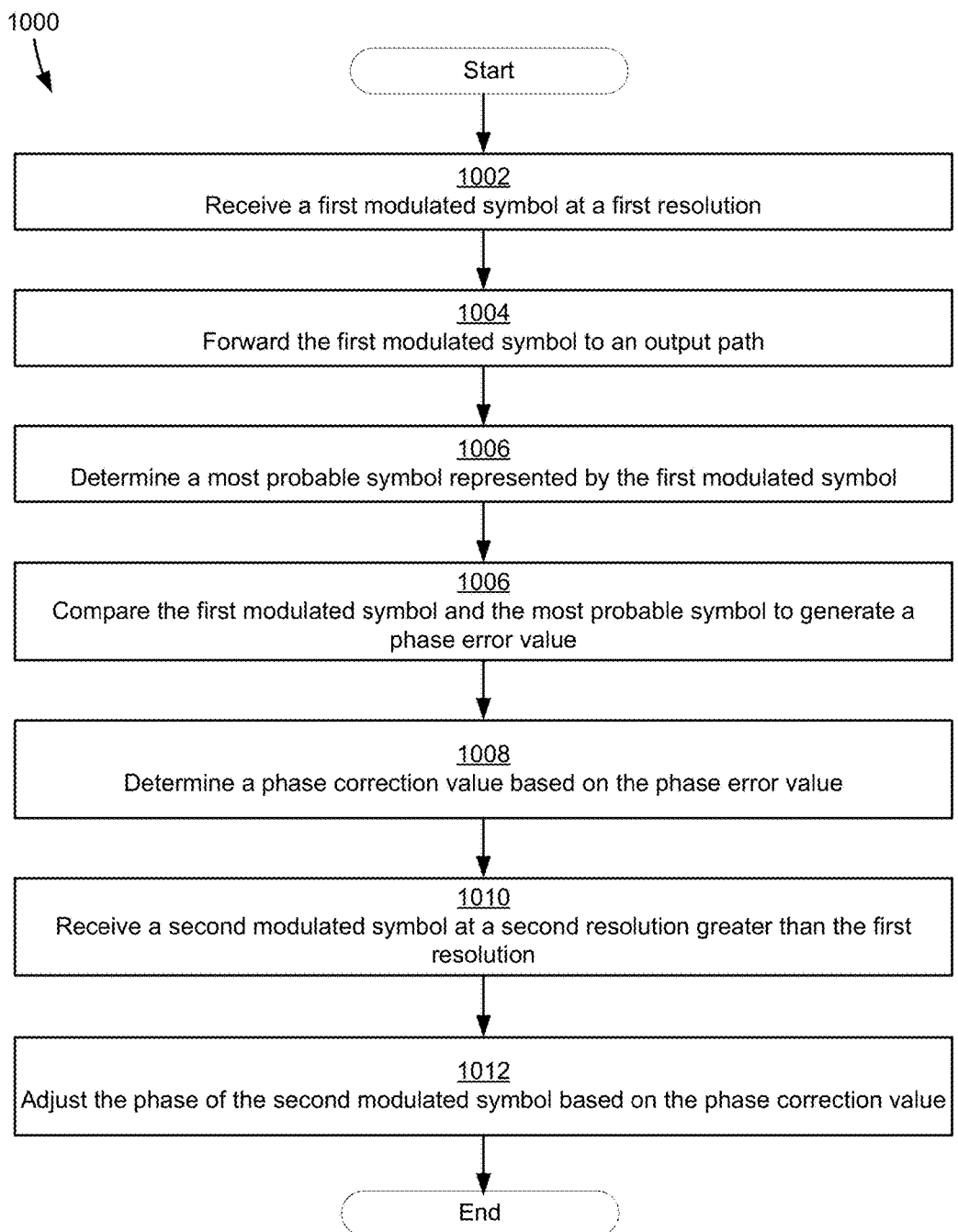
FIG. 10 shows an example of a method for correcting a phase of modulated symbols, according to some embodiments.

FIG. 10 shows an example of a method 1000 for correcting a phase of modulated symbols, according to some embodiments. The method 1000 is discussed in conjunction with the carrier recovery system 606, shown in FIG. 7. It is noted that the method 1000 may have additional steps or sub-steps, and that all steps shown in FIG. 10 may not be necessary for the method 1000. In step 1002, the symbol receiver 717 may be configured to receive a first modulated symbol at a first resolution and thereafter a second modulated symbol at a second resolution greater than the first resolution. The first resolution may correspond to a pilot data resolution and the second resolution may correspond to a standard data resolution. In step 1004, the phase modifier 702 may be configured to forward the first modulated symbol to an output path, which may comprise the reference eliminator 708 and the demodulator interface 710. In step 1006, the decision device 718 may be configured to determine a most probable symbol represented by the first modulated symbol to generate a phase error value. In step 1008, the phase detector 722 may be configured to determine a phase correction value based on the phase error value. In step 1010, the phase modifier 702 may be configured to determine a phase correction value based on the phase error value. In step 1012, the phase modifier 702 may be configured to adjust the phase of a second modulated symbol based on the phase correction value.

Figure 11:
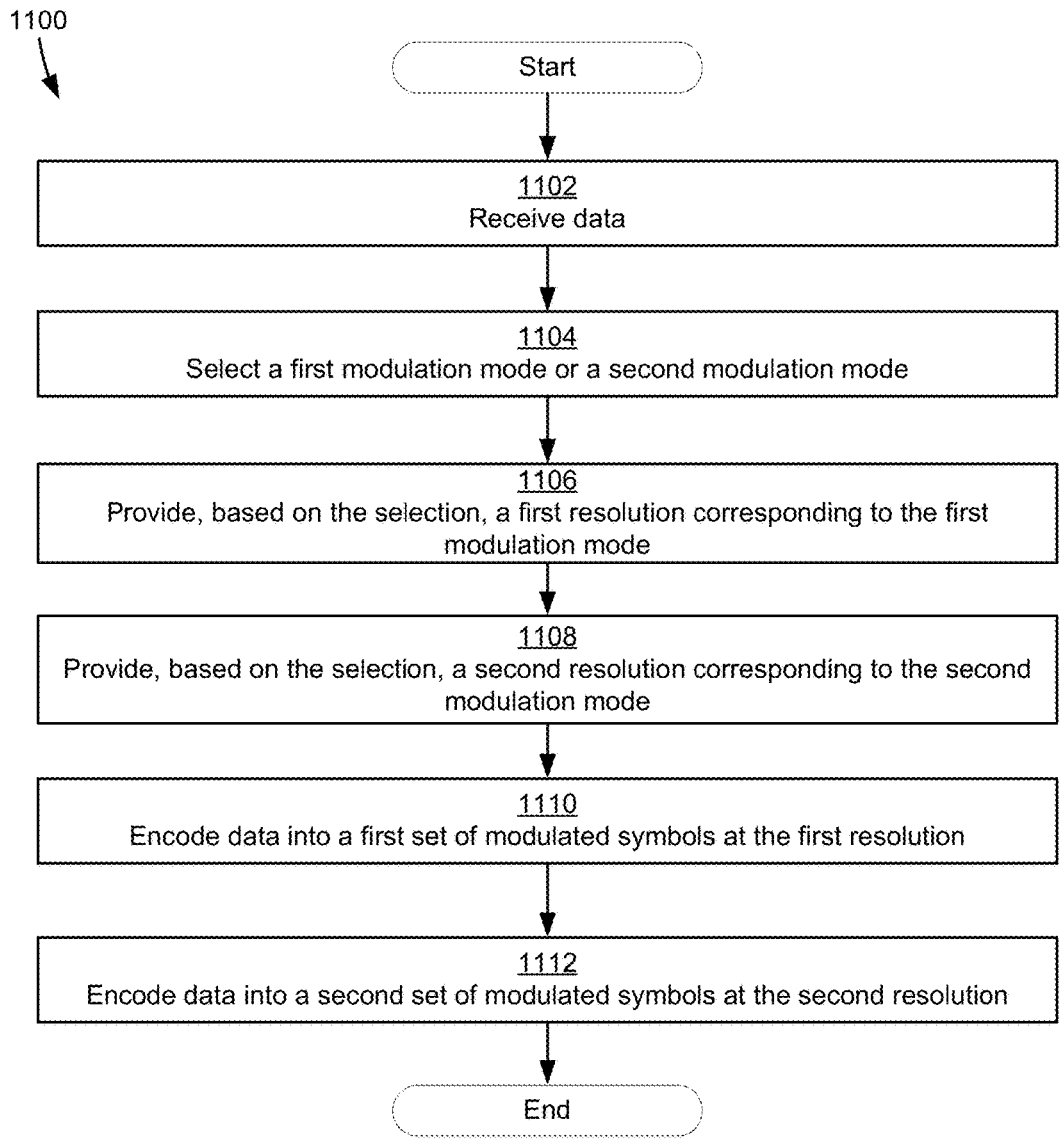
FIG. 11 shows an example of a method for modulating data, according to some embodiments.

FIG. 11 shows an example of a method 1100 for modulating data, according to some embodiments. The method 1100 is discussed in conjunction with the multilevel QAM encoder 306, shown in FIG. 4. It is noted that the method 1100 may have additional steps or sub-steps, and that all steps shown in FIG. 11 may not be necessary for the method 1100. In step 1102, the data receiver 402 may receive data from a digital device. In step 1104, the modulation mode selector 404 may be configured to select a first modulation mode or a second modulation mode. In step 1106, modulation mode selector 404 may be configured to provide, based on the selection, a first resolution corresponding to the first modulation mode. The first resolution may comprise a pilot data resolution. In step 1108, the modulation mode selector 404 may be configured to provide, based on the selection, a second resolution corresponding to the second resolution mode. The second resolution may comprise a standard data resolution. In step 1110, the modulator 406 may be configured to encode data into a first set of modulated symbols at the first resolution. In step 1112, the modulator 406 may be configured to encode data into a second set of modulated symbols at the second resolution.

The invention claimed is:

1. A transmitter system, comprising:
an interface configured to receive data for wireless radio frequency transmission to a receiver system;
a modulator configured to encode a first data portion of the data to generate a first pilot data symbol set for a first wireless radio frequency transmission to the receiver system, the first pilot data symbol set including first pilot data symbols at a first pilot data resolution, configured to encode a plurality of second data portions of the data to generate a plurality of non-pilot data symbol sets for a plurality of second wireless radio frequency transmissions to the receiver system, each non-pilot data symbol set including non-pilot data symbols at a non-pilot data resolution greater than the pilot data resolution, configured to encode a third data portion of the data to generate a second pilot data symbol set for a third wireless radio frequency transmission to the receiver system, the second pilot data symbol set including second pilot data symbols at a second pilot data resolution that is lower than the non-pilot data resolution, and configured to generate a pilot dataless symbol set for a fourth wireless radio frequency transmission to the receiver system, the pilot dataless symbol set including pilot dataless symbols at a pilot dataless symbol resolution; and an interface configured to communicate the first pilot data symbol set at the first pilot data resolution over the first wireless radio frequency transmission to the receiver system, configured to communicate the plurality of non-pilot data symbol sets each at the non-pilot data resolution over the plurality of second wireless radio frequency transmissions to the receiver system, and configured to communicate the second pilot data symbol set at the second pilot data resolution over the third wireless radio frequency transmission to the receiver system, the receiver system configured to use at least one of the first pilot data symbols in the first pilot data symbol set to generate a first phase error correction value for use in decoding the non-pilot data symbols of the plurality of non-pilot data symbol sets at the non-pilot data resolution, the receiver system further configured to use at least one of the second pilot data symbols of the second pilot data symbol set to generate a second phase error correction value for use in decoding subsequent non-pilot data symbol sets and the receiver system further configured to use at least one of the pilot dataless symbols in the pilot dataless symbol set to generate a third phase error correction value for use in decoding subsequent non-pilot data symbol sets.

2. The transmitter system of claim 1, wherein the modulator includes a Quadrature Amplitude Modulation (QAM) encoder.

3. The transmitter system of claim 1, wherein the first pilot data resolution equals the second pilot data resolution.

4. The transmitter system of claim 1, wherein the first pilot data resolution is less than the second pilot data resolution.

5. The transmitter system of claim 1, wherein the modulator generates the second pilot data symbol set after generating a preset plurality of the non-pilot data symbol sets.

6. The transmitter system of claim 1, wherein the modulator periodically generates the second pilot data symbol set.

7. The transmitter system of claim 1, wherein the modulator includes a modulation mode selector that enables selection of the first pilot data resolution, the non-pilot data resolution, or the second pilot data resolution.

8. A method, comprising:
receiving data for wireless radio frequency transmission to a receiver system;
encoding a first data portion of the data to generate a first pilot data symbol set for a first wireless radio frequency transmission to the receiver system, the first pilot data symbol set including first pilot data symbols at a first pilot data resolution;
communicating the first pilot data symbol set at the first pilot data resolution over the first wireless radio frequency transmission to the receiver system;
encoding a plurality of second data portions of the data to generate a plurality of non-pilot data symbol sets for a plurality of second wireless radio frequency transmissions to the receiver system, each non-pilot data symbol set including non-pilot data symbols at a non-pilot data resolution greater than the first pilot data resolution;
communicating the plurality of non-pilot data symbol sets each at the non-pilot data resolution over the plurality of second wireless radio frequency transmissions to the receiver system;
encoding a third data portion of the data to generate a second pilot data symbol set for a third wireless radio frequency transmission to the receiver system, the second pilot data symbol set including second pilot data symbols at a second pilot data resolution that is lower than the non-pilot data resolution;
communicating the second pilot data symbol set at the second pilot data resolution over the third wireless radio frequency transmission to the receiver system, the receiver system configured to use at least one of the first pilot data symbols in the first pilot data symbol set to generate a first phase error correction value for use in decoding the non-pilot data symbols of the plurality of non-pilot data symbol sets at the non-pilot data resolution, the receiver system further configured to use at least one of the second pilot data symbols of the second pilot data symbol set to generate a second phase error correction value for use in decoding subsequent non-pilot data symbol sets; and
generating a pilot dataless symbol set for a fourth wireless radio frequency transmission to the receiver system, the pilot dataless symbol set including pilot dataless symbols at a pilot dataless symbol resolution, the receiver system further configured to use at least one of the pilot dataless symbols in the pilot dataless symbol set to generate a third phase error correction value for use in decoding subsequent non-pilot data symbol sets.

9. The method of claim 8, wherein the first pilot data resolution equals the second pilot data resolution.

10. The method of claim 8, wherein the first pilot data resolution is less than the second pilot data resolution.

11. The method of claim 8, wherein the generating the second pilot data symbol set occurs after generating a preset plurality of the non-pilot data symbol sets.

12. The method of claim 8, wherein the generating the second pilot data symbol set comprises generating the second pilot data symbol set periodically.

* * * * *